United States Patent [19]

Natarajan

[11] Patent Number: 5,581,543
[45] Date of Patent: Dec. 3, 1996

[54] COMMUNICATION NETWORK AND METHOD WHICH RESPOND TO A FAILED LINK

[75] Inventor: Kadathur S. Natarajan, Mesa, Ariz.

[73] Assignee: Motorola, Inc., Schaumburg, Ill.

[21] Appl. No.: 395,229

[22] Filed: Feb. 27, 1995

[51] Int. Cl.⁶ .................................................. H04J 3/14
[52] U.S. Cl. .................. 370/221; 379/221; 395/182.02; 340/827
[58] Field of Search ............................. 370/16, 16.1, 54, 370/60, 60.1, 94.3, 95.1; 379/221; 395/182.01, 182.02; 340/827

[56] References Cited

U.S. PATENT DOCUMENTS

| | | | |
|---|---|---|---|
| 4,991,204 | 2/1991 | Yamamoto et al. | 379/221 |
| 4,999,829 | 3/1991 | Fite, Jr. et al. | 370/16 |
| 5,029,334 | 7/1991 | Braun et al. | 370/95.1 |
| 5,130,974 | 7/1992 | Kawamura et al. | 370/54 |
| 5,182,744 | 1/1993 | Askew et al. | 370/16 |
| 5,249,181 | 9/1993 | Wang et al. | 370/60 |
| 5,260,945 | 11/1993 | Rodeheffer | 395/182.02 |
| 5,444,693 | 8/1995 | Arslan et al. | 370/16 |

*Primary Examiner*—Douglas W. Olms
*Assistant Examiner*—Min Jung
*Attorney, Agent, or Firm*—Harold C. McGurk

[57] ABSTRACT

A communications network (20) includes a constellation (30) of any number of moving switching nodes and a route-determining node (28). The route-determining node (28) performs an off-line procedure (58) to define a-priori routing for the entire network for a planning period. When a link (40) fails, the switching nodes (30) terminating the link (40) implement an interim rerouting procedure (78). The route-determining node (28) then operates in a failure response mode to quickly devise updated routing definitions. In the failure response mode route trees (110) which include the failed link (40') are identified. Shortest path routes for nodes (30) isolated by the link failure are revised to omit the failed link (40'). Shortest path routes for non-isolated nodes (30) and in route trees which do not include the failed link are not changed.

22 Claims, 5 Drawing Sheets

COMMUNICATION NETWORK AND METHOD WHICH RESPOND TO A FAILED LINK

FIELD OF THE INVENTION

The present invention relates generally to communication networks. More specifically, the present invention relates to the routing of communications through a multiplicity of communication links and to responding to failures in the links.

BACKGROUND OF THE INVENTION

Communication networks, such as those used to deliver telecommunications, to interconnect computers, and the like, may include any number of nodes interconnected by communication links. The networks may deliver electronic communications between two points by routing the communications over the links from node to node within the network. As the number of nodes in a network increases and as the number of communication paths available to each network node increases, the number of potential paths available for delivering any single communication likewise increases.

Accordingly, networks often use techniques for specifying a route to follow when delivering a communication from an origination node to a destination node. These techniques can be sophisticated and are often carried out by computer analysis based upon models of the entire network. The complexity of the route specification problem and the amount of intelligence and processing power required to solve the route specification problem can force at least a portion of the route determination problem to be solved "off-line" before the communications are actually delivered through the network nodes.

However, selecting routes before communication delivery makes the network vulnerable to link failures. For example, when an off-line process evaluates the route determination problem, a particular link may be operational. Thus, the off-line process specifies the use of the particular link in various routes from various origination nodes to various destination nodes. If this particular link then fails, all communications being delivered in accordance with the off-line process specifications over routes that include the link likewise fail to reach their intended destinations.

The failure of a single link, or even several links, need not permanently impede communications because networks typically support many different routes between potential origination and destination nodes. Thus, the network's off-line route determining process may be repeated taking into account any failed link so that it no longer specifies routes that include the failed link. Unfortunately, this may be a complex and time-consuming process. Moreover, the length of time is increased when the physical configuration is dynamic, such as when network nodes are moving, so that the entire process must be repetitively performed for numerous iterations to track or otherwise simulate the node movement. An additional delay occurs when the solution of the route determination problem is then delivered through the network to all nodes prior to its implementation by the network. The delivery problem may be worse still due the inclusion of failed links in routes over which the solutions are delivered. Consequently, communications may continue to fail for an undesirable long duration after a link failure. Accordingly, there is a significant need for a network and method which respond to a failed link.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DESCRIPTION OF THE PREFERRED EMBODIMENTS

Figure 1:
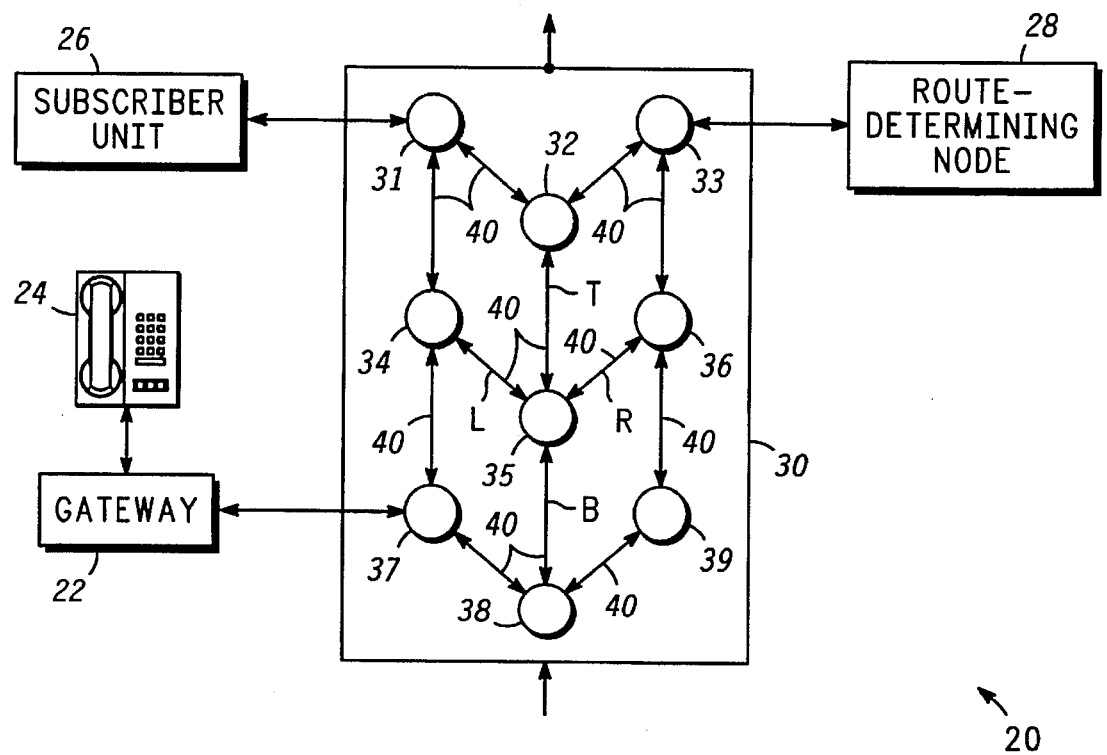
FIG. 1 shows a block diagram of a communications network.

FIG. 1 shows a block diagram of a communications network 20. In the preferred embodiments, network 20 includes any number of gateways 22, each of which couples to any number of telephonic devices 24, such as conventional telephone instruments, facsimile machines, modems, and the like. Likewise, network 20 includes any number, potentially but not necessarily in the millions, of subscriber units 26 and one or more route-determining nodes 28. Gateways 22, subscriber units 26, and route-determining nodes 28 use RF communications to communicate with one another through a constellation 30 of switching nodes. In the preferred embodiments, the vast majority of subscriber units 26 are intended to be mobile units which may freely move anywhere on or near the surface of the earth and which may support one call at a time. Gateways 22 and route-determining nodes 28 are also located on or near the surface of the earth, but they may simultaneously support a multiplicity of independent calls. Nothing prevents a route-determining node 28 from also serving as a gateway 22, and vice-versa.

Constellation 30 is formed from any number of switching nodes, which are generally or collectively referred to as switching nodes. In the preferred embodiment, constellation 30 comprises sixty-six switching nodes distributed in low earth, polar orbits to provide coverage over substantially the entire surface of the earth. However, for the sake of clarity FIG. 1 illustrates only an example constellation 30 which includes nine switching nodes, individually referred to with the numbers 31–39. The number of switching nodes may be greater or less than sixty-six switching nodes and the switching nodes may orbit earth in orbits other than polar orbits.

Due to the low-earth orbits, the switching nodes move. In the preferred embodiment, the switching nodes move relative to the earth at speeds of around 25,000 Km/Hr and move relative to each other as their orbits converge while approaching the poles and diverge as they approach the equator. Gateways 22, subscriber units 26, and route-determining nodes 28, which may reside anywhere on the earth, communicate directly with a switching node that is overhead at the moment the communications take place. However, due to the speed at which the switching nodes move, the switching node which supports a given earth-bound link changes from moment to moment.

In the preferred embodiments, gateways 22, route-determining nodes 28 and switching nodes are all computer controlled equipment. In other words, each includes processors, controllers, or other programmable devices which cause the nodes to operate in accordance with computer software which is stored in a memory located in the node. The switching nodes and gateways 22 include switching fabrics which are likewise computer controlled. The switching fabrics cause communications which enter the nodes on any of a variety of links to then leave the nodes over a variety of links. In the preferred embodiments, each switching node has a switching capacity which matches the capacity of all links terminated at the node. In other words, when all links terminated at a switching node carry their maximum amount of communication traffic, the switching node can successfully switch the communication traffic as needed to allow the communication traffic to be delivered through network 20.

In particular, the switching nodes communicate with one another through communication links 40. Desirably, each switching node terminates two or more links 40. For clarity, FIG. 1 illustrates links 40 as terminating only at some neighbor nodes, with no links wrapping around between top and bottom and left and right sides of constellation 30. However, this is not a requirement of the present invention. As a general case, switching node 35 terminates four links 40, which couple to neighbor switching nodes in top (T), bottom (B), left (L), and right (R) directions relative to switching node 35.

In network 20 a communication may originate at any location on or near the surface of the earth. The communication is routed through a gateway 22, subscriber unit 26, or route-determining node 28 to constellation 30. The one of switching nodes 31–39 which receives this up-link communication is considered an origination node. Network 20 routes the communication through switching nodes 31–39 in a manner which is described below. The one of switching nodes 31–39 where the communication is down-linked to the surface of the earth to either a gateway 22, subscriber unit 26, or route-determining node 28 is considered the destination node. All switching nodes that receive the communication from another switching node and transmit the communication to another switching node are considered intermediate nodes.

As an example, FIG. 1 illustrates a scenario where a communication destined for subscriber unit 26 may originate at telephonic instrument 24, and pass through gateway 22, where it is up-linked to switching node 37. Switching node 37 is the origination node, and switching node 31 is the destination node. Network 20 has many options in selecting links 40 for use in routing the communication between origination node 37 and destination node 31. However, a route which passes from node 37, to node 34, and to node 31 is desirable because it is a shortest path route. In other words, any other route will require the use of a greater number of links 40 to deliver the communication between origination and destination nodes 37 and 31. This route makes node 34 an intermediate node for this communication.

Shortest path routes are desirable because they minimize the delay involved in delivering the communication. In addition, they are desirable because they cause network 20 to expend fewer of its finite resources in delivering any single communication, which allows a greater number of resources to remain available for delivering other communications. Further, shortest path routes are more reliable because a failure of a link 40 in constellation 30 is less likely to affect a route which includes fewer links.

Figure 2:
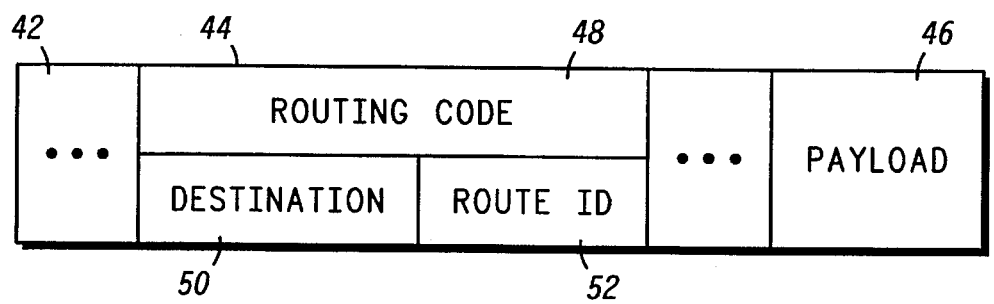
FIG. 2 shows a data format diagram of a data packet delivered by the communications network.

FIG. 2 shows a data format diagram of a digital data packet 42 delivered by network 20 (see FIG. 1) in the preferred embodiment. Packet 42 includes a header portion 44 and a payload portion 46. Payload portion 46 conveys the information whose delivery is the purpose for network 20. Header portion 44 conveys overhead data which network 20 uses to manage the delivery of payload portion 46. These overhead data include a routing code 48, which an origination switching node appends to payload data. The routing code defines the route which the packet 42 will take from its origination switching node, through intermediate switching nodes if any, to its destination switching node.

Routing code 48 includes a destination node ID 50 and a logical route ID 52. Destination node ID 50 identifies the destination switching node for packet 42. Route ID 52 specifies one of a plurality of logical routes to follow in delivering packet 42 to its destination switching node. Logical route IDs 52 are assigned to as many physically distinct routes as possible. All packets for a given call desirably follow the same route.

Figure 3:
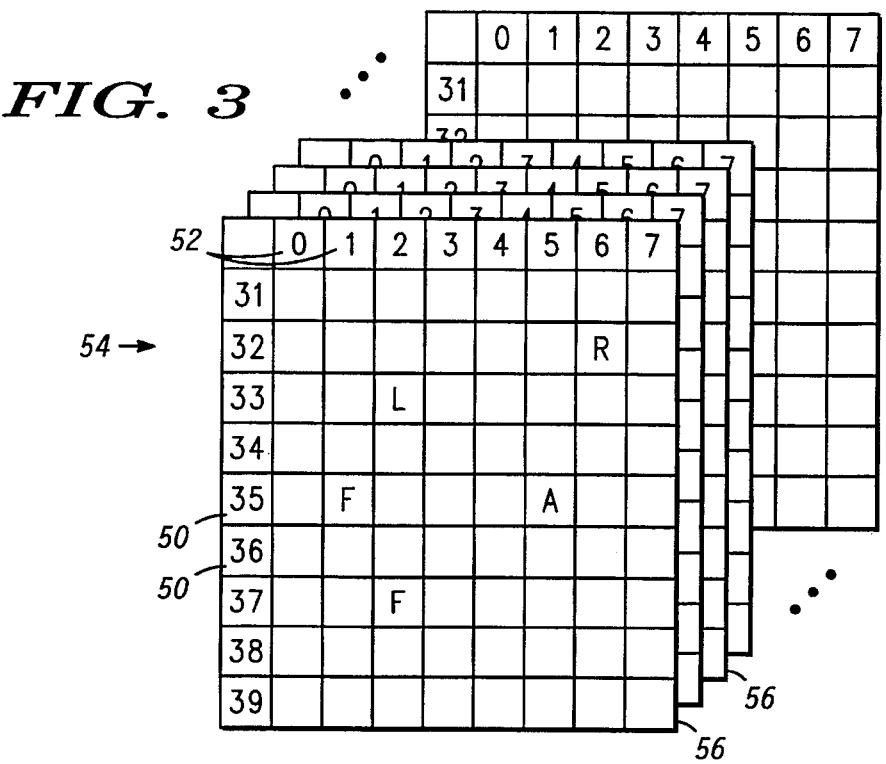
FIG. 3 shows a block diagram of a memory structure maintained at switching nodes within the communications network to define routing.

FIG. 3 shows a block diagram of an exemplary routing code table 54 which may be stored at each switching node. Each switching node has its own version of table 54, and no two tables 54 need be identical. Tables 54 are formed off-line at route-determining node 28 (see FIG. 1) and sent to the switching nodes before tables 54 are activated. FIG. 3 illustrates table 54 as being a three-dimensional memory structure. One dimension represents time, another represents route IDs 52 (see FIG. 2), and a third represents destination node IDs 50 (see FIG. 2). FIG. 3 depicts route IDs 52 using codes of zero through seven. Thus, each destination may be reached using any one of eight logically different routes. FIG. 3 depicts destination node IDs 50 using the codes of 31–39 to correspond with the switching nodes 31–39 illustrated in FIG. 1.

A single destination node/route ID array 56 is activated for a given epoch, and table 54 may include any number of arrays 56 to describe routing for any number of epochs. Different arrays 56 are associated with different epochs to track the movement of constellation 30 (see FIG. 1). A routing scheme which may be valid at one moment and defined in one array 56 becomes invalid the next, but another array 56 will define a valid routing scheme for that next moment. In the preferred embodiment, the epochs may be separated from one another by a duration of several seconds to a few minutes. All epochs taken together span a period of time called a planning period. In the preferred embodiments, the planning period lasts longer than 30 hours and is desirably updated at least once a day. Thus, the switching nodes continue to possess valid routing definitions, and these definitions remain valid for several hours should communications with route-determining node 28 become temporarily interrupted.

As discussed above, routing code 48 (see FIG. 2) is appended to a packet 42 (see FIG. 2) at gateway 22 or the origination switching node when the packet's payload data 46 is received over an up-link. When the origination and intermediate switching nodes obtain a packet 42 to which routing code 48 has been appended, they use the routing code 48 as an index into the one of their arrays 56 which is activated for the instant in time when the packet 42 is received. The array 56 produces an identity code for a link 40 (see FIG. 1) to use in routing the packet 42 onto its destination, and the switching node routes the packet 42 in response to this identity code. When the packet 42 arrives at its destination switching node, either array 56 or other controls route the packet 42 on a down-link to a gateway 22, subscriber unit 26, or route-determination node 28 (see FIG. 1). In the example depicted in FIGS. 1 and 3, the identity codes for links 40 specify top (T), bottom (B), left (L), or right (R) links for different routing scenarios.

Figure 4:
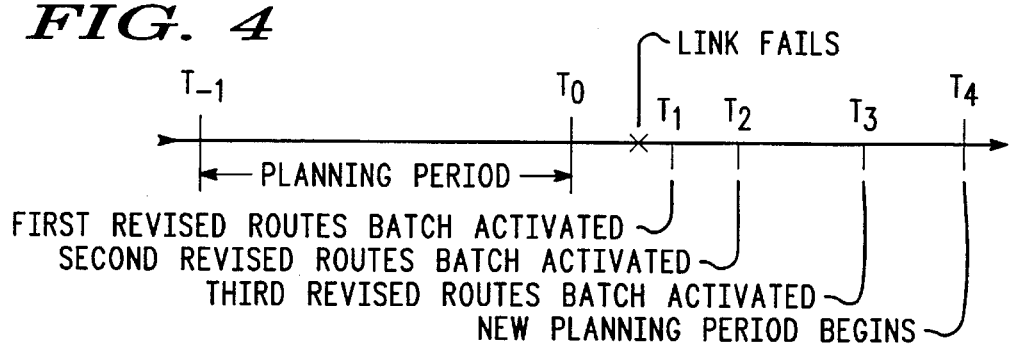
FIG. 4 shows a timing diagram depicting the occurrence of events related to a link failure within the communications network.

FIG. 4 shows a timing diagram depicting the occurrence of events related to a possible link failure within network 20. A single planning period extends between time instants $T_{-1}$ and $T_0$. Prior to time instant $T_0$ new routing data are received at every switching node so that at time instant $T_0$ every switching node activates an array 56 in its table 54 (see FIG. 3) which is associated with time instant $T_0$. The new routing data define routing for the new planning period, which extends from time instant $T_0$ to time instant $T_4$. However, if a link 40 fails in constellation 30, such as link 40' which is terminated by switching nodes 33 and 36 in the example illustrated in FIG. 1, the new routing data become partially invalid. In particular, when tables 54 in various switching nodes specify routes which include link 40', switching nodes 33 and 36 (see FIG. 1) attempt to deliver communications over link 40'. Since link 40' has failed, network 20 now needs to recognize and respond to the failure so that communications will not be dropped.

Figure 5:
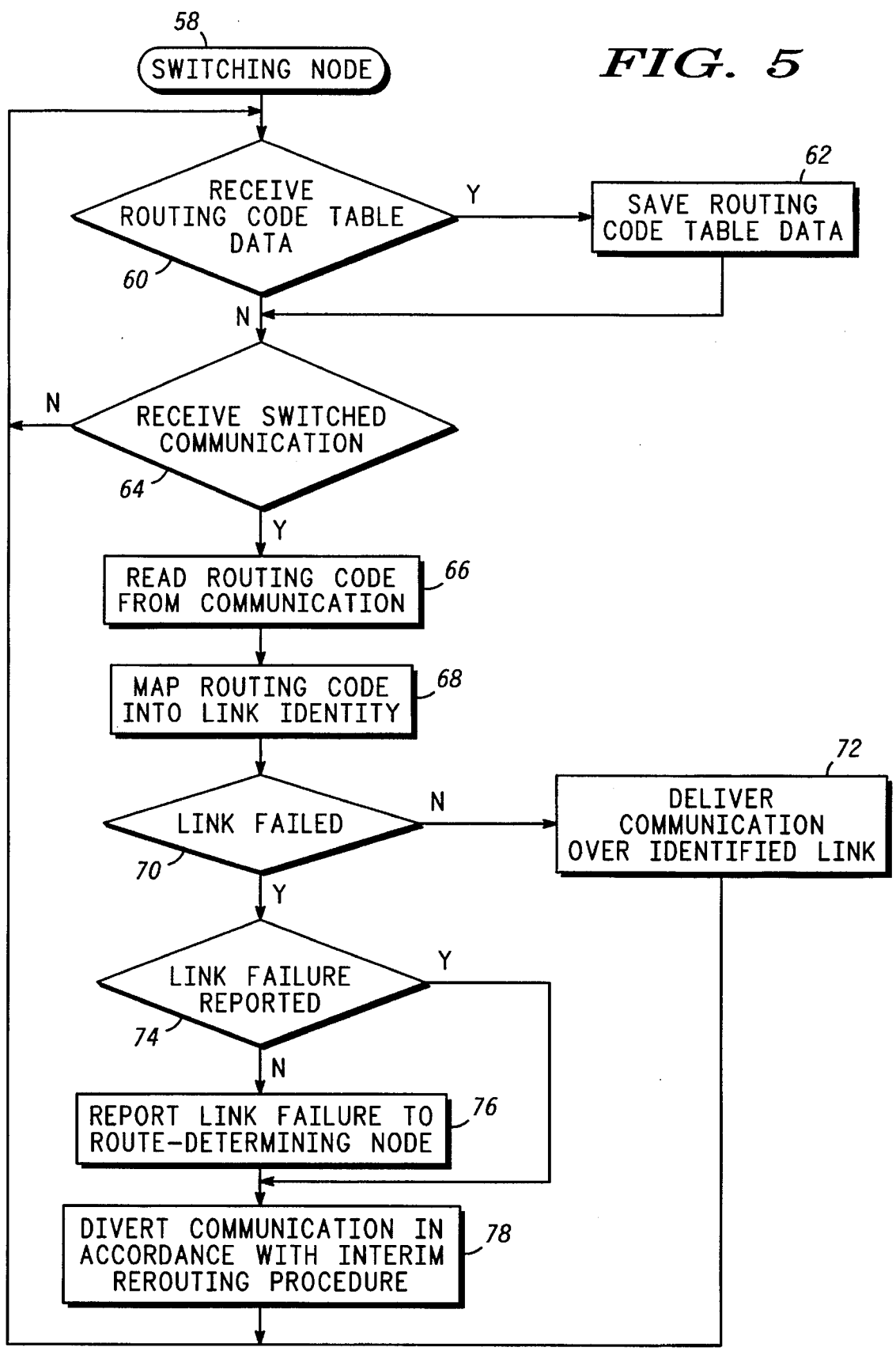
FIG. 5 shows a flow chart of a procedure performed by switching nodes.

FIG. 5 shows a flow chart of a procedure 58 performed by each switching node. Procedure 58 is performed by processing, controlling, or like devices which operate in response to software programming instructions stored in a memory of the node. Nothing prevents procedure 58 from performing numerous steps which are not related to the present invention. However, procedure 58 includes a query step 60 which determines whether data intended for storage in routing code table 54 (see FIG. 3) have been received at the node. The data may fill an entire routing code table 54 for an entire planning period or only a small portion thereof which affects selected routing codes on only a selected batch of arrays 56 (see FIG. 3). When such routing code table data are received, step 62 performs any needed decoding and acknowledgments and saves the routing code table data at appropriate locations in table 54.

After step 62 and when step 60 fails to detect the receipt of routing code table data, a query step 64 determines whether the node 30 has received a switched communication. A packet 42 (see FIG. 2) which has routing code 48 appended thereto and which requires routing through origination and switching nodes to a destination node is an example of a switched communication. Of course, a switched communication also refers to a stream of such packets. When no switched communication has been received, program control loops back to perform other steps not directly related to the present invention and to perform step 60, discussed above.

When step 64 detects the receipt of a switched communication packet 42 (see FIG. 2), step 66 reads the routing code 48 (see FIG. 2) appended thereto. Next, step 68 maps this routing code 48 into a link identity through routing code table 54 (see FIG. 3). The link identity specifies whether to use a top (T), bottom (B), left (L), or right (R) link 40 in transmitting the packet 42 onward toward its destination.

After step 68, a query step 70 determines whether the identified link has failed. Step 70 may rely upon conventional tests to verify link integrity. Such conventional tests include internal hardware self-tests, occasional background loop-back procedures conducted in cooperation with neighbor nodes 30, and the like. So long as no failure indication has been detected for the identified link, step 72 delivers the communication packet over the identified link. After step 72, program control loops back to perform other steps not directly related to the present invention and step 60, discussed above.

When step 70 determines that the identified link has failed, a query step 74 determines whether the link failure has been reported yet. If the switching node detecting a link failure is unaware of any link failure reports being previously made, step 76 is performed to report the link failure to route-determining node 28 (see FIG. 1). The link failure report may be made by sending a data communication message to route-determining node 28. While one link terminated by a switching node detecting a link failure, such as link 40' in FIG. 1, may have failed, other links 40 remain operational. Thus, the switching node can still deliver its link failed message through network 20 over the operational links 40. Moreover, if an entire switching node fails, the failure resembles the simultaneous failure of multiple links 40. Other switching nodes are likely to remain operational and be able to report the failures to route-determining node 28. Consequently, route-determining node 28 is highly likely to receive link failed messages shortly after a link fails. Referring briefly to FIG. 4, time "X" denotes an instant when link 40' fails in an example scenario.

After step 76, and when step 74 determines that a link failure has already been reported, step 78 diverts the communication packet in accordance with an interim rerouting procedure. The interim rerouting procedure is one which is driven by internal programming for the switching node, not necessarily table 54 (see FIG. 3). Desirably, the interim rerouting procedure diverts the communication to a link 40 other than the failed link 40'. In addition, the interim rerouting procedure desirably diverts the communication to an operational link 40 which is not the same link 40 over which the communication was received. Within these parameters, several different procedures may be devised. For example, the interim rerouting procedure may divert communications by delivering the communication over a link located counterclockwise (or clockwise) to the failed link, but skipping the incoming link.

The interim rerouting procedure is desirably configured to minimize the likelihood of packets 42 becoming lost in routing loops. Packets 42 which become lost in routing loops are passed back and forth among the same nodes 30. Eventually, when the nodes 30 determine that the packets 42 have become too stale to deliver, the looping packets 42 are dropped without reaching their destination. Giving a packet 42 back to the node 30 from which it was received is likely to cause that node 30 to return it again and initiate a routing loop. Thus, the interim rerouting procedure desirably omits diverting the communication packet to the node from which it was received. However, other interim rerouting procedures cannot guarantee freedom from routing loops, and a certain fraction of diverted communications are likely to be dropped. In addition, even when communications are not dropped unnecessary delay may be imposed on the communications by the interim rerouting procedure.

Consequently, network 20 takes additional actions, discussed below, to quickly revise routing definitions so that the interim rerouting procedure need not be used for a longer duration than necessary. In particular, these actions insure that a recovering response may occur prior to time $T_4$ (see FIG. 4), when the next planning period is scheduled to begin. A quicker response to a link failure is desirable because quicker responses result in fewer communications being dropped and less delay being imposed on communications which are successfully delivered. Moreover, quicker responses reduce the likelihood that network 20 will have to operate with multiple link failures, a situation which, in some situations, may be more difficult to address.

After diverting the communication at step 78, program control loops back to perform other steps not directly related to the present invention and to perform step 60, discussed above. As additional packets 42 are received and directed over failed link 40' by table 54, they will also be diverted in accordance with the interim rerouting procedure. This process continues even when new epochs occur and cause new arrays 56 (see FIG. 3) in table 54 to activate. Eventually, table 54 will be updated through steps 60 and 62. As described in detail below, the updated routing code table data refrain from defining routes that include failed link 40'. Thus, when updated routing code table data are received, stored in table 54, and activated at the appropriate epochs, the interim rerouting procedure will cease operation because steps 68 and 70 will cease to specify the delivery of packets 42 over failed link 40'.

Figure 6:
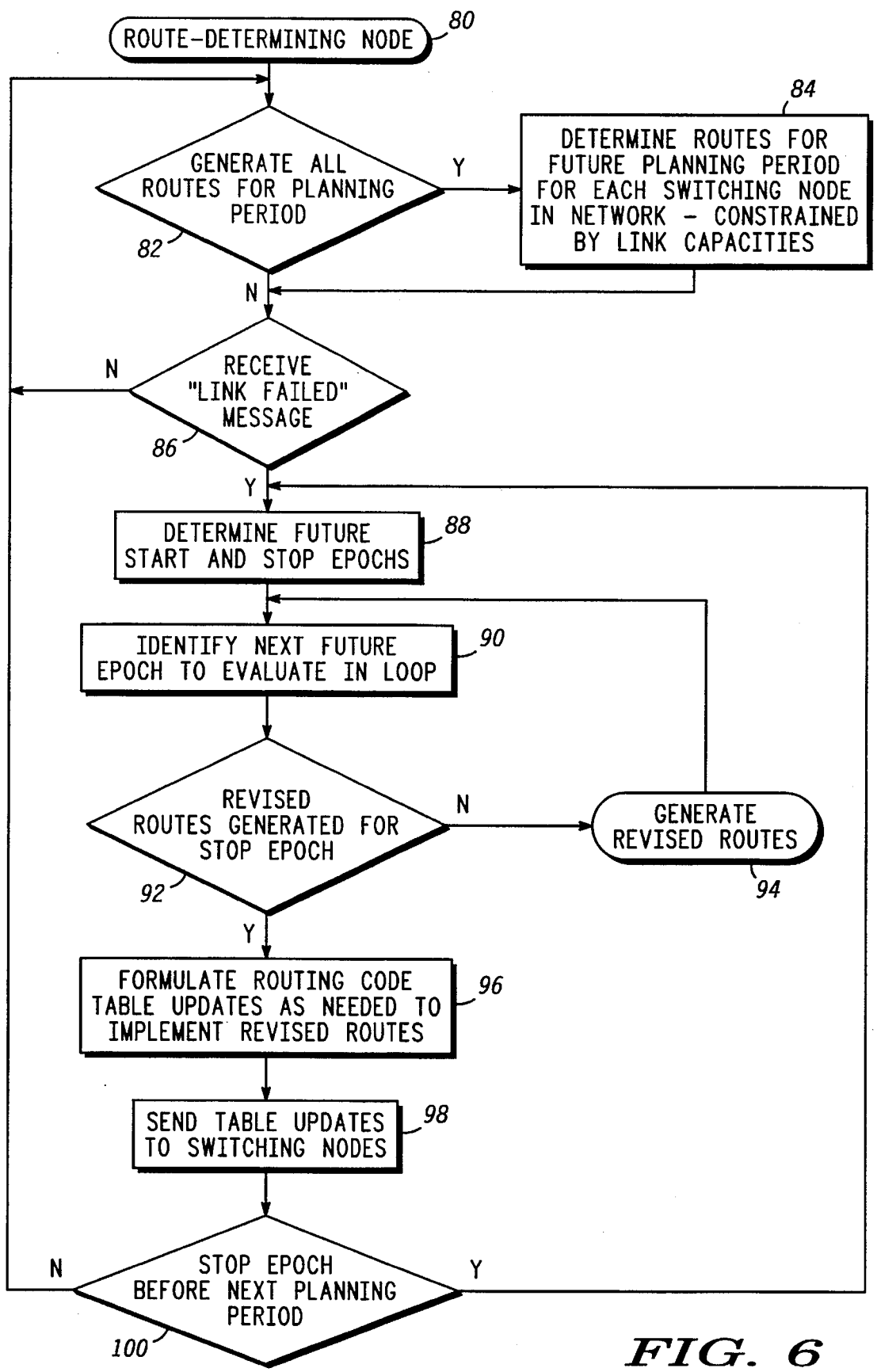
FIG. 6 shows a flow chart of a procedure performed by a route-determining node.

FIG. 6 shows a flow chart of a procedure 80 performed by route-determining node 28 (see FIG. 1). Procedure 80 is performed by processing, controlling, or like devices which operate in response to software programming instructions stored in a memory of node 28. Nothing prevents procedure 80 from performing numerous steps which are not related to the present invention. However, procedure 80 includes a query step 82 which determines whether to generate all routes used by network 20 for an upcoming planning period. Step 82 may respond to the current time so that network routes are automatically generated on a predetermined schedule, or step 82 may respond to user input provided by a human operator at node 28 or elsewhere. When step 82 determines that an entire planning period's routes now need to be generated, step 84 is performed to generate such routes.

Step 84 determines the routing definitions which network 20 will follow in a future planning period. Procedure 80 performs step 84 while operating in a normal mode and not in a failure response mode, discussed below, which quickly responds to link failures. Routing is designed for all potential combinations of origination and destination switching nodes and all epochs in the upcoming planning period. Moreover, step 84 desirably constrains routing to accommodate link capacities. A failed link, such as link 40' (see FIG. 1) has a capacity to convey zero calls. Other links may also have a capacity for zero calls because they may have been intentionally shut down. Desirably, step 84 designs routing to use only non-zero capacity links 40. In a preferred embodiment, step 84 predicts call traffic between all potential origination and destination nodes and designs routes to match this predicted call traffic with link capacities so that each link has sufficient capacity to deliver traffic predicted for the link. However, this is not a requirement of the present invention.

In the preferred embodiments, logical route ID 52 (see FIG. 3) is conveyed using three bits of data. Thus, each packet 42 (see FIG. 2) may specify any one of eight logical routes to a destination switching node. Desirably, these logical routes correspond to shortest path, physically distinct routes as often as possible, given origination and destination node combinations.

Figure 7:
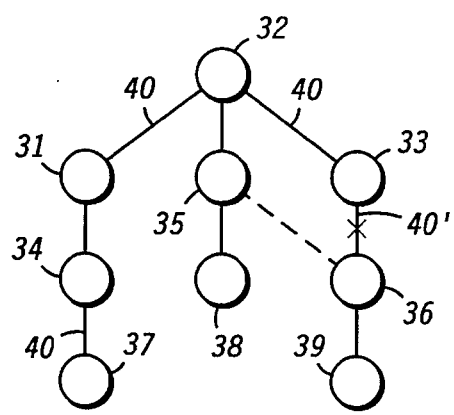
FIG. 7 shows a graphical depiction of a first route tree for a specified destination node.
Figure 8:
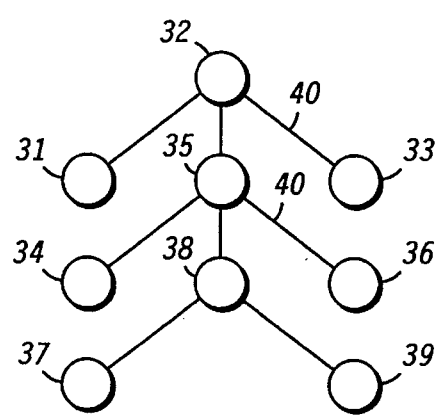
FIG. 8 shows a graphical depiction of a second route tree for the specified destination node.

FIGS. 7 and 8 show graphical depictions of first and second route trees for an example scenario. This example scenario involves switching nodes 31–39 linked together as shown in FIG. 1 and involves switching node 32 as a destination node. Additional distinct route trees which may be devised for this example scenario are not shown. Each route tree corresponds to one of the many logical route IDs 52. Thus, up to eight different route trees may be prepared for each destination switching node in network 20 in the preferred embodiment. Each route tree depicts shortest paths between each origination node and destination node 32. While the different route trees have some links 40 in common, other links 40 are not commonly used. Of course, for networks with a greater number of switching nodes and/or more complex link interconnections, different route trees may exhibit even greater diversity in physical path selection.

FIG. 7 illustrates a failure in the first route at link 40', which terminates at switching nodes 33 and 36. FIG. 8 shows no route failure because the second route does not include a link between switching nodes 33 and 36. Moreover, while the first route has failed due to the failure of link 40', it remains operational with respect to the non-isolated origination switching nodes, which do not use link 40'. The non-isolated switching nodes for this scenario include nodes 31, 35, 33, 34, 38, and 37. Only nodes 36 and 39 are isolated in the first route by a failure of link 40'.

Referring back to FIG. 6, step 84 generates several different route trees for each switching node acting in a destination node capacity. Moreover, step 84 desirably translates the route tree into data which are sent to routing code tables 54 (see FIG. 3) in each switching node.

After step 84 and when step 82 determines not to generate all routes for a future planning period, procedure 80 performs a query step 86. Step 86 determines whether route determining node 28 has received a link failed message from a switching node. If no link failed message has been received, program control loops back to perform steps unrelated to the present invention and to perform step 82, discussed above.

When a link failed message is detected at step 86, process 80 operates in a failure response mode by proceeding to step 88, where route-determination node 28 begins the process of quickly responding to the failure of a link 40. The link failed message desirably coveys the identity of the failed link. Step 88 determines future start and stop epochs which define a future period of time for which updated routing data are to be generated. In the preferred embodiments, start and stop epochs are defined so that updated routing data are generated for a period of time more brief than the planning period.

Step 88 desirably establishes a start epoch which is no farther in the future than necessary. Thus, network 20 need not operate under the interim rerouting procedure discussed above in connection with step 78 (see FIG. 5) for longer than necessary. On the other hand, the stop epoch is set sufficiently far into the future to allow route-determining node 28 to generate revised routing data and to deliver the revised routing data to the switching nodes throughout network 20. For the example scenario depicted in FIG. 4, the initial start epoch may be set at a time instant $T_1$.

Step 88 desirably establishes a stop epoch which is minimally delayed from the start epoch. For the example scenario depicted in FIG. 4, the initial stop epoch may be set at a time instant $T_2$. A lengthy duration between start and stop epochs, such as might occur by using $T_4$ (see FIG. 4) as a stop epoch, is undesirable because it involves a greater amount of data than a shorter duration. This greater amount of data requires a longer time to generate and a longer time to deliver to the switching nodes. Consequently, greater delay between start and stop epochs causes network 20 to operate under the interim rerouting procedure for a longer duration. On the other hand, the stop epoch needs to be sufficiently delayed from the start epoch to permit route-determining node 28 to generate and deliver a subsequent batch of routing data updates before the actual stop epoch occurs.

After step 88 defines start and stop epochs, step 90 identifies a next future epoch to evaluate in a programming loop. Step 90 is performed in a programming loop which generates updated routing data for the entire network 20 for the future period defined by the start and stop epochs. One iteration of this loop is performed for each epoch between the start and stop limits, inclusive. After step 90, a query step 92 determines whether revised routes have been generated yet for the stop epoch. So long as the stop epoch has not yet been evaluated, a process 94 is performed to generate revised routes for the subject epoch. Process 94 is discussed below in connection with FIG. 9. When process 94 completes its generation of revised routes for a subject epoch, program control loops back to step 90, where the next epoch is evaluated.

When step 92 eventually determines that revised routes have been generated for the stop epoch, step 96 formulates routing code table updates as needed to implement the revised routes. Desirably, process 94 and step 96 are each configured to reduce the quantity of data involved in defining revised routes relative to the quantity of data involved in the normal planning period route definition mode. The reduction of data allows route revision data to be generated more quickly and speeds delivery of the revised routing data to the switching nodes.

After step 96, step 98 sends the routing code table updates to the switching nodes. Step 98 delivers the updated data over network 20, which has a failed link. Consequently, the successful delivery of any one message is not necessarily guaranteed. Thus, step 98 may involve the sending of multiple messages and the verifying of appropriate acknowledgments in delivering the revised routing data.

Next, a query step 100 determines whether the stop epoch occurs before the beginning of the next planning period. So long as the stop epoch occurs before the beginning of the next planning period, program control loops back to step 88 and process 80 remains in its link failure response mode. After looping back to step 88, revised routes are generated for new start and stop epochs. For the example scenario depicted in FIG. 4, a second iteration of step 88 sets time instant $T_2$ as a start epoch and a time instant $T_3$ as a stop epoch, and a third iteration of step 88 sets time instant $T_3$ as a start epoch and time instant $T_4$ as a stop epoch. Thus, revised routes are generated and delivered to the switching nodes in batches until the next planning period begins. When step 100 eventually determines that the stop epoch matches the beginning of the next planning period, process 80 leaves the link failure response mode and program control loops back to perform steps unrelated to the present invention and to perform step 82, discussed above. Until another link failed message is received, network 20 continues to operate in the normal mode where routing is designed and implemented for an entire planning period.

Figure 9:
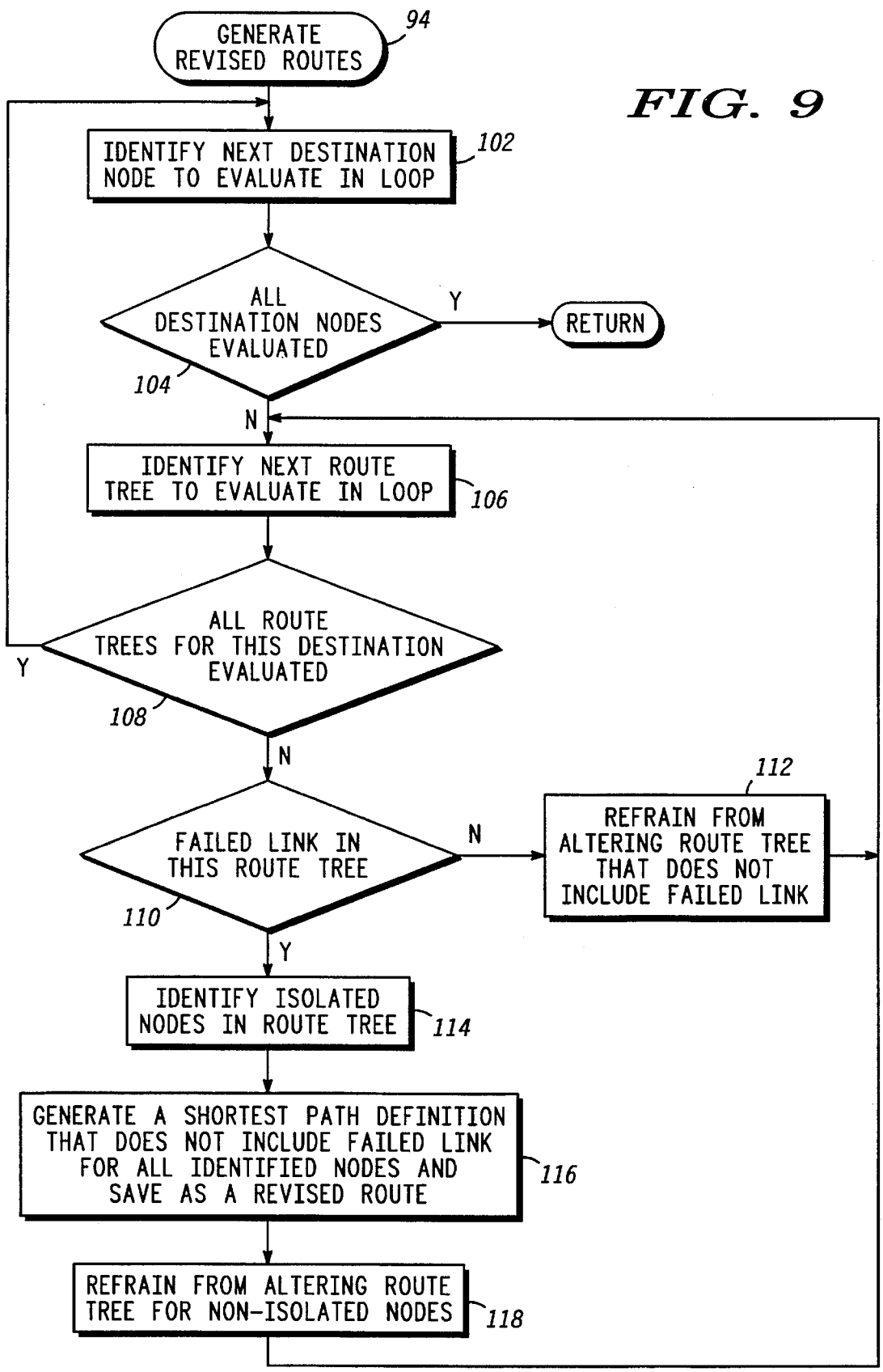
FIG. 9 shows a flow chart of a generate revised routes process performed by the route-determining node.

FIG. 9 shows a flow chart of process 94, which generates revised routes as discussed above in connection with FIG. 6. Generally, process 94 implements an outer programming loop, wherein each iteration of the outer loop evaluates a different switching node in a destination node role. Process 94 also implements an inner programming loop, wherein each iteration of the inner loop evaluates a different route tree for the subject destination node. Route trees which include a failed link are identified and altered as necessary to reconnect isolated nodes. The data describing the alteration serve as revised routing data. Routing data resulting from route trees which do not include the failed link and routing data resulting from non-isolated nodes are not altered.

Process 94 performs step 102 to identify a next destination node to evaluate in a programming loop which eventually evaluates all the switching nodes in a destination node role. After step 102, a query step 104 determines whether all destination nodes have been evaluated yet. When all destination nodes are evaluated, process 94 has finished, and program control returns to step 90 (see FIG. 6) in process 80.

When step 104 determines that all destination nodes have not yet been evaluated, step 106 identifies a next route tree to evaluate in a programming loop which eventually evaluates all route trees prepared for the subject destination node. In the preferred embodiment, up to eight different route trees may be prepared for each switching node operating in a destination node role. FIGS. 7 and 8 depict two of the route trees which may be prepared for an example scenario with node 32 as the subject destination node. After step 106, a query step 108 determines whether all route trees for the subject destination node have been evaluated yet. When all route trees have been evaluated, program control loops back to step 102 to process the next destination node.

When step 108 determines that not all route trees have been evaluated, a query step 110 determines whether the subject route tree includes a failed link. As discussed above, the route tree depicted in FIG. 7 includes failed link 40', but the route tree depicted in FIG. 8 does not include a failed link. When step 110 determines that the subject route tree does not include a failed link, as depicted by the route tree in FIG. 8, then the route tree does not define a failed route. Step 112 is performed to take any actions which may be necessary to refrain from altering a route tree which does not include a failed link. Step 112 may be completed quickly, and may even be performed in some situations by taking no action. Accordingly, process 94 quickly deals with routes that have not failed. After step 112, program control loops back to step 106 to evaluate the next route tree for the subject destination node.

When step 110 determines that a subject route tree includes a failed link, as depicted in FIG. 7, process 94 has discovered a failed route. Step 114 identifies all nodes which are isolated in the route tree by the failed link. In the example scenario depicted in FIG. 7, nodes 36 and 39 are isolated by the failure of link 40' because the failed link prevents communications from these origination nodes to be delivered to destination node 32.

Next, step 116 generates a shortest path definition that does not include the failed link. Shortest path definitions are generated for all isolated nodes. The resulting shortest path definitions are saved as a revised route. FIG. 7 indicates the revised shortest path definitions by the dotted line linking nodes 35 and 36. The failed route is revised by altering the route tree to include the link 40 between nodes 35 and 36 rather than failed link 40'. This revised route is configured to divert communications away from the failed link.

After step 116, step 118 is performed to take any actions necessary to refrain from altering the route tree with respect to non-isolated nodes. Step 118 may be completed quickly, and may even be performed in some situations by taking no action. Accordingly, process 94 quickly deals with non-isolated nodes in failed route trees. After step 118, program control loops back to step 106 to evaluate the next route tree for the subject destination node.

In summary, the present invention provides an improved communications network and method for responding to a failed link. The preferred embodiments of the present invention respond to a link failure in a manner that reduces the number of communication failures and delays imposed by the link failure. The preferred embodiments of the present invention respond to a link failure by quickly revising only a fraction of an entire routing plan.

The present invention has been described above with reference to preferred embodiments. However, those skilled in the art will recognize that changes and modifications may be made in these preferred embodiments without departing from the scope of the present invention. For example, those skilled in the art may arrange processes, steps, and procedures differently than described herein while achieving equivalent results. These and other changes and modifications which are obvious to those skilled in the art are intended to be included within the scope of the present invention.

What is claimed is:

1. A method of responding to a failed link in a network which delivers communications and which has a multiplicity of links each of which terminate at pairs of switching nodes, the method comprising the steps of:

reporting the failed link to a route-determining node;

identifying, at the route-determining node, failed routes resulting from the failed link, the failed routes defining a set of paths each of which includes the failed link and each of which is used to route communications through the switching nodes;

generating, at the route-determining node, revised routes to replace the failed routes;

detecting the failed link at one of the switching nodes which terminates the failed link;

diverting, at the one switching node, communications being delivered over routes which include the failed link to a link other than the failed link; and sending data after the diverting step describing the revised routes from the route-determining node to the switching nodes.

2. A method as claimed in claim 1, wherein the generating step includes the step of configuring the revised routes to divert communications away from the failed link.

3. A method as claimed in claim 1, further comprising the steps of:

the one switching node terminating the failed link and operational links; and routing communications received at the one switching node for delivery over the failed routes to a selected one of the operational links, the selected operational link not being a link from which the communications were received at the one switching node.

4. A method as claimed in claim 1, wherein the generating step comprises the step of refraining from altering routes which are not failed routes.

5. A method as claimed in claim 1, wherein the generating step comprises the step of determining, for each of the failed routes, a shortest path which does not include the failed link, the shortest paths serving as the revised routes.

6. A method of responding to a failed link in a network which delivers communications and which has a multiplicity of links each of which terminate at pairs of switching nodes, the method comprising the steps of:

reporting the failed link to a route-determining node;

identifying, at the routed-determining node, failed routes resulting from the failed link, the failed routes defining a set of paths each of which includes the failed link and each of which is used to route communications through the switching nodes;

generating, at the route-determining node, revised routes of a future epoch to replace the failed route;

sending data describing the revised routes from the route-determining node to the switching nodes:

repeating the generating step for each of a plurality of future epochs so that a set of revised routes is associated with each of the future epochs;

sending the sets of the revised routes; and operating the switching nodes substantially at each of the future epochs in response to the sets of the revised routes.

7. A method as claimed in claim 6, further comprising the step of generating, from time to time at the route-determining node, a series of updated routes for each switching node in the network.

8. In a network which delivers communications and which has a multiplicity of links each of which terminate at pairs of switching nodes, a method of responding to a failed link comprising the steps of:

detecting the failed link at one of the switching nodes which terminates the failed link;

reporting the failed link to a route-determining node;

temporarily diverting, at the one switching node, communications being delivered over routes which include the failed link to a link other than the failed link;

identifying, at the route-determining node, failed routes resulting from the failed link, the failed routes defining a set of paths each of which includes the failed link and each of which is used to route communications through the switching nodes;

generating, at the route-determining node, a set of revised routes to replace the failed routes, the revised routes being associated with a future epoch;

sending, prior to the future epoch and after the diverting step, data describing the revised routes from the route-determining node to the switching nodes; and operating the switching nodes substantially at the future epoch in response to the revised routes.

9. A method as claimed in claim 8 further comprising the step of:

terminating the failed link and operational links at the one switching node; and routing communications received at the one switching node for delivery over the failed routes to a selected one of the operational links, the selected operational link not being a link from which the communications were received at the one switching node.

10. A method as claimed in claim 8, further comprising the steps of:

repeating the generating step for each of a plurality of future epochs so that a set of revised routes is associated with each of the future epochs;

sending the sets of the revised routes; and operating the switching nodes substantially at each of the plurality of future epochs in response to the sets of the revised routes.

11. A method as claimed in claim 10, further comprising the step of generating, from time to time at the route-determining node, a series of updated routes for each switching node in the network.

12. A method as claimed in claim 8, wherein the generating step comprises the step of determining, for each of the failed routes, a shortest path which does not include the failed link, the shortest paths serving as the revised routes.

13. A method as claimed in claim 12, wherein the determining step includes the step of refraining from changing routes which are not failed routes.

14. A fault-tolerant communications network, comprising:
   a switching node configured to detect a failed link which terminates at a node, to report the failed link using a message delivered through the network and to divert communications being delivered over routes which do not include the failed link; and
   a route-determining node, coupled to the switching node, configured to respond to the message by identifying failed routes which result from the failed link, the failed routes defining a set of paths each of which includes the failed link and each of which is used in delivering communications through the network, by generating a set of revised routes to replace the failed routes, and by sending after the switching node begins to divert communication data describing the revised routes to various switching nodes of the network.

15. A network as claimed in claim 14, wherein the route-determining node is configured so that the revised routes divert communications away from the failed link.

16. A network as claimed in claim 14, wherein the route-determining node is configured to associate the revised routes with a future epoch and to send data describing the revised routes prior to the future epoch.

17. A network as claimed in claim 14, wherein the route-determining node is configured to refrain from altering routes which are not failed routes while generating the set of revised routes.

18. A network as claimed in claim 14, wherein the route-determining node is configured to determine, for each of the failed routes, a shortest path which does not include the failed link, the shortest paths serving as the revised routes.

19. A method of responding to a failed link in a network which delivers communications and which has a multiplicity of links each of which terminate at pairs of switching nodes, the method comprising the steps of:

generating, at the route-determining node, revised routes to replace the failed routes;

detecting the failed link at one of the switching nodes which terminates the failed link;

diverting, at the one switching node, communications being delivered over routes which include the failed link to a link other than the failed link; and sending data after the diverting step describing the revised routes from the route-determining node to the switching nodes.

20. A method of responding to a failed link in a network which delivers communications and which has a multiplicity of links each of which terminate at pairs of switching nodes, the method comprising the steps of:

generating, at a route-determining node, a set of revised routes for each of a plurality of future epochs;

sending data describing the sets of revised routes from the route-determining node to the switching nodes; and operating the switching nodes substantially at each of the future epochs in response to the sets of the revised routes.

21. A fault-tolerant communications network comprising:
   a switching node configured to detect a failed link, to report the failed link using a message delivered through the network and to divert communications being delivered over routes which do not include the failed link; and
   a route-determining node, coupled to the switching node, configured to respond to the message by generating a set of revised routes associated with each of a plurality of future epochs to replace the failed routes and by sending data describing the sets of revised routes to various switching nodes of the network.

22. A fault-tolerant communications network comprising:
   a switching node configured to detect a failed link, to report the failed link using a message delivered through the network and to divert communications being delivered over routes which do not include the failed link; and
   a route-determining node, coupled to the switching node, configured to respond to the message by generating a set of revised routes to replace the failed routes and by sending after the switching node begins to divert the communications data describing the revised routes to various switching nodes of the network.

* * * * *